United States Patent [19]

Balteau

[11] Patent Number: 4,616,103

[45] Date of Patent: Oct. 7, 1986

[54] DEVICE WITH CONTROLLED DEFORMATION FOR PROTECTING POWER LINES AGAINST OVERLOADING DUE TO THE WEATHER

[75] Inventor: Jacques Balteau, Charleville-Mezieres, France

[73] Assignee: Usines Metallurgiques L.C.A.B. SA, France

[21] Appl. No.: 706,144

[22] Filed: Feb. 27, 1985

[30] Foreign Application Priority Data

Mar. 5, 1984 [FR] France ............................... 84 03502

[51] Int. Cl.[4] .................. H02G 7/02; H02G 7/04; F16F 7/12
[52] U.S. Cl. ................... 174/40 TD; 188/372; 267/74; 267/182
[58] Field of Search ............... 174/40 R, 40 TD, 43, 174/45 R, 45 TD, 149 R, 150; 267/69, 74, 182; 188/371, 372, 376; 248/548

[56] References Cited

U.S. PATENT DOCUMENTS

| | | | |
|---|---|---|---|
| 388,487 | 8/1888 | Harris | 174/43 |
| 3,568,806 | 3/1971 | Butt | 267/154 X |

FOREIGN PATENT DOCUMENTS

| | | | |
|---|---|---|---|
| 1051351 | 2/1959 | Fed. Rep. of Germany | 174/43 |
| 1154540 | 9/1963 | Fed. Rep. of Germany | . |
| 1615702 | 6/1970 | Fed. Rep. of Germany | . |
| 2719103 | 11/1978 | Fed. Rep. of Germany | 174/43 |
| 2364371 | 4/1978 | France | . |

Primary Examiner—Laramie E. Askin
Attorney, Agent, or Firm—Lerner, David, Littenberg, Krumholz & Mentlik

[57] ABSTRACT

A device for relieving mechanical loads on electrical conductors and line poles. The device includes arms pivoted to one another and a rod connected to the arms so that upon pivoting movement of the arms towards a full open position the rod is elongated. An indicator link is provided for indicating deformation of the rod.

10 Claims, 9 Drawing Figures

DEVICE WITH CONTROLLED DEFORMATION FOR PROTECTING POWER LINES AGAINST OVERLOADING DUE TO THE WEATHER

The device according to the invention is intended for equipping the fittings of line poles supporting low, medium and high tension power lines in order to protect them.

The fittings supporting the lines generally consist of one or more metal sections fixed to the top of the line poles.

These fittings, consisting of commercial laminated sections, are strengthened to enable them to withstand the tension of the conductors when the lines are installed and, in use, at times of additional overloading due to wind, snow or ice. However, this overloading can generate tensile stresses greater than the strength of the conductors or line poles and can cause them to break, the consequence of which is to interrupt the flow of current and to necessitate fairly expensive repair work.

To rectify this situation, provision has been made to instal, between the fittings and the lines, devices which make it possible to reduce the stresses exerted on the conductors and the line poles by reducing the tension exerted by the lines through increasing the sag of the conductors between the line poles.

Devices of this type are described in the following published French patent applications:

FR-A-2,344,991, 2,379,927, 2,407,591 and 2,466,888, relating to deformable fittings.

FR-A-1,215,585, relating to an automatic tension regulator for overhead lines, the purpose of which is to compensate the lengthening or shortening of a line by the expansion and contraction of a liquid contained in a closed chamber.

Although deformable fittings do in fact make it possible to prevent the line poles from breaking, they need to be replaced after deformation, which entails arduous and expensive work.

The automatic tension regulator enables a certain sag to be maintained on the conductors for fairly limited additional overloading, but does not offer an adequate guarantee for the exceptional overloading due especially to snow or ice.

The aim of the device with controlled deformation according to the invention is to overcome the above-mentioned disadvantages, while at the same time protecting the line poles, the fittings and the conductors.

Basically, this device, which makes it possible to reduce the stresses exerted on the conductors and power line poles by reducing the tension of the conductors and increasing their sag between the line poles, consists of four arms articulated in pairs to form two dividers whose branch separation, under the action of the tension of the wires or cables, is controlled by the tensile elongation of a rod, and the device includes a means permitting a remote visual indication of the elongation of the rod.

The tension of the wires or cables is exerted at the end of the articulated arms, via extension pieces, and is retransmitted, amplified by a lever effect, to the rod via two pivot pins, two spacer sleeves, a guide tube and nuts.

The rod is a rod threaded over the whole of its length.

The means permitting a remote visual indication of the elongation of the rod consists of an indicator provided with a slot and fitted to the end of the bolts joining the arms to the extension pieces, so that one of the bolts can slide freely in the slot and release the said indicator with a rocking action for a given value of the elongation of the rod.

Several elementary devices can be associated in series or in series-parallel so as to increase the slackening distance and/or the deformation resistance of the assembly.

Further characteristics and advantages will become apparent in the following description of a device constructed according to the invention, which is given as a non-limiting example with reference to the attached drawings; in these drawings.

Figure 1:
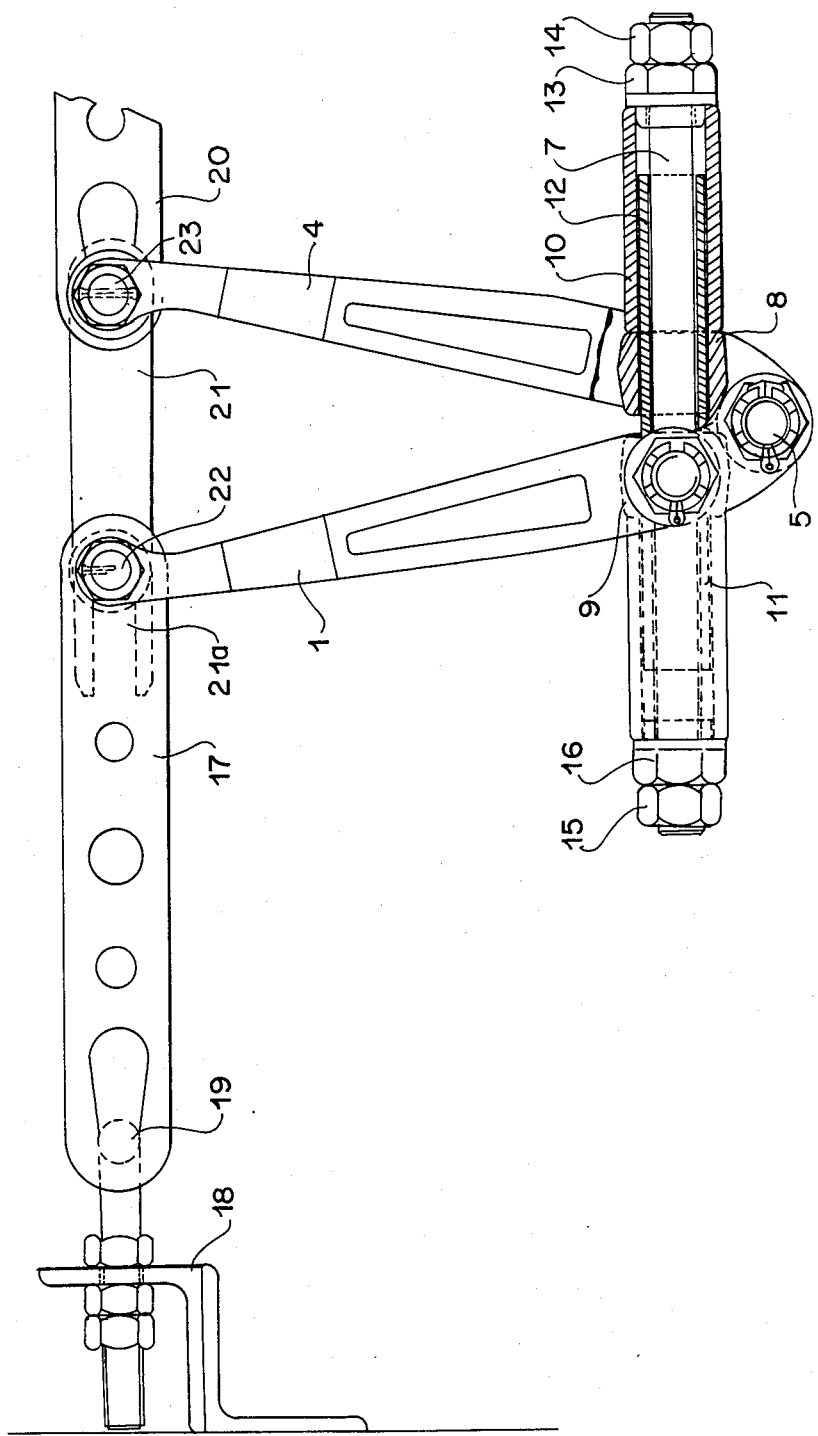
FIG. 1 is a front view in partial section of the device before deformation of the rod.

As illustrated in FIGS. 1-4, a device according to one embodiment of the present invention includes a first pole-side arm 1 and a first conductor-side arm 2, these arms being pivotally connected to one another at a first pivot axis by a first bolted hinge pin 6. A second pole-side arm 3 and a second conductor-side arm 4 are pivotally connected to one another at a second pivot axis, coincident with the first pivot axis, by a second bolted hinge pin 5.

A threaded rod 7 having predetermined tensile elongation properties is connected to the arms by pivot pins 8 and 9, spacer sleeves 10 and 11, and nuts 13, 14, 15 and 16. As best seen in FIG. 2, pivot pin 9 is connected to both of the pole-side arms 1 and 3, whereas pivot pin 8 (FIG. 1) is connected to the conductor-side arms 2 and 4. A sleeve 10 surrounds rod 7 adjacent one end thereof. One end of sleeve 10 is connected to the end of rod 7 by nut 13 engaged with the threads of the rod, nut 14 bearing on nut 13. The opposite end of sleeve 10 bears on pivot pin 8. Sleeve 11, surrounding the other end of rod 7, is similarly connected to the rod by nuts 15 and 16, and bears on pivot pin 9. A guide tube 12 extends within sleeves 10 and 11.

Figure 2:
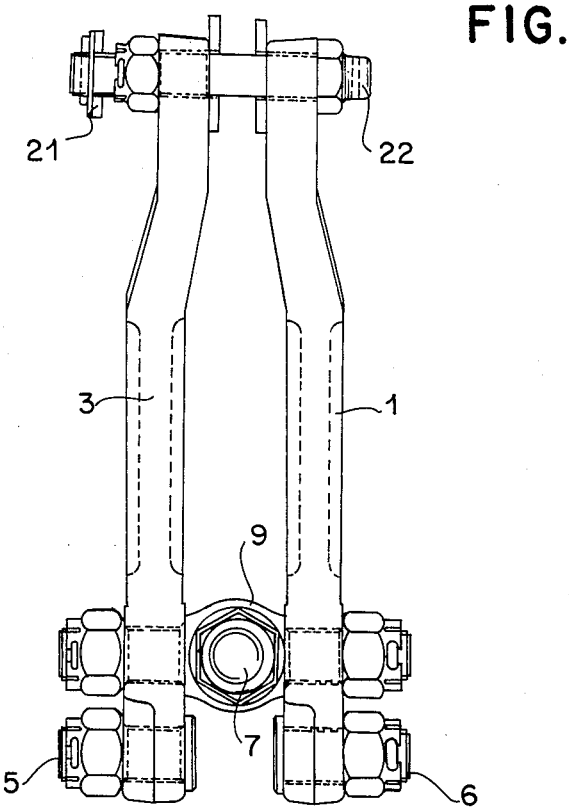
FIG. 2 is a side view of the device before deformation of the rod.
Figure 3:
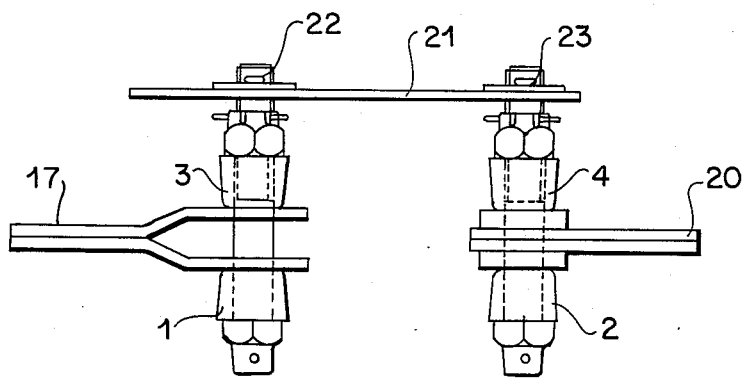
FIG. 3 is a top view of the device before deformation of the rod.
Figure 4:
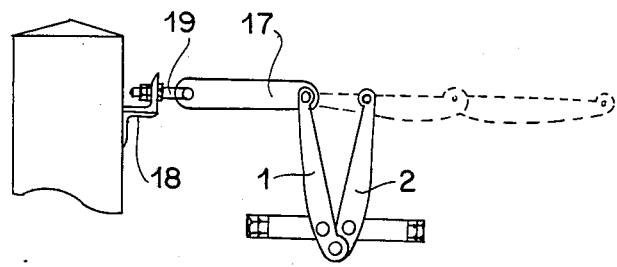
FIG. 4 is a diagrammatic view showing the assembly diagram for one apparatus with the extreme positions indicated in dashed lines.
Figure 5:
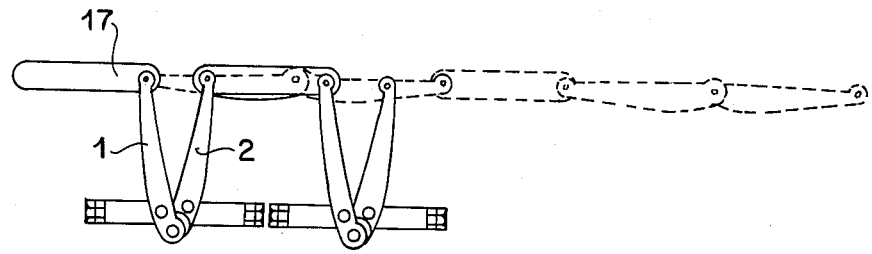
FIG. 5 is a diagrammatic view showing the assembly diagram for two apparatuses in series with the extreme positions indicated in dashed lines.
Figure 6:
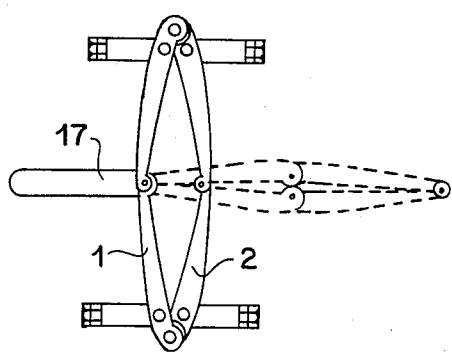
FIG. 6 is a diagrammatic view showing the assembly diagram for two apparatuses in parallel with the extreme positions indicated in dashed lines.

In the condition of the device, illustrated in FIGS. 1-3 and illustrated in solid lines in FIG. 4, the arms are in a closed position. Thus, the distal end first pole-side arm 1, i.e., the end of arm 1 remote from hinge pin 6, is disposed adjacent the distal end of first conductor-side arm 2, i.e., the end of arm 2 remote from hinge pin 6.

Likewise, the distal end of the second pole-side arm 3, (the end remote from hinge pin 5) is disposed adjacent the distal end of second conductor-side arm 4. With the arms in their closed position, rod 7 extends transverse to the arms and protrudes outwardly beyond the arms, as best seen in FIG. 1.

The tension of the wires is transmitted to the distal ends of the arms 1, 2, 3 and 4 via an extension piece 17 fixed to the fitting 18 by a hook bolt 19 and by an extension piece 20 joined to the insulator or other device. Extension piece 17 is connected to pole-side arms 1 and 3, whereas extension piece 20 is connected to conductor-side arms 2 and 4.

The tensile elongation of the rod 7, is indicated visually by means of an indicator link 21 provided with a slot 21a fitted to the end of the bolts 22 and 23 fixing the extension pieces 17 and 20, so that one of the bolts, e.g., 22, can slide freely in the slot 21a.

The line, consisting of conductors 24, is supported by line poles 25 equipped with fittings 26, insulators 27 and devices with controlled deformation 28. The conductors have a sag f1 initially and a sag f2 after the device has functioned.

Thus, as can be seen, the tension exerted by the conductors 24 is transmitted to the arms 1, 2, 3 and 4 of the apparatus and to the rod 7 via the extension pieces 17 and 20 and the bolts 22 and 23.

When the overload exceeds a given value, rod 7 extends, the articulated arms 1, 2, 3 and 4 separate, i.e., swing outwardly, away from one another in pivoting motion about pins 5 and 6, so that the distal ends of the conductor-side arms move away from the distal ends of the pole-side arms. Upon such movement, the bolt 22 moves in the slot 21a of the indicator link 21, making it possible to indicate the deformation visually. The conductors are then slackened and the sag which they form increases until an equilibrium situation is reached between the elastic tension exerted by the rod and the tension exerted by the conductors, taking into account the ratio of the lever arms.

If the overload increases further, rod 7 initially continues to extend by elastic deformation, which enables the arms to return to their original separation and the conductors to their initial sag when the overload disappears as the snow or frost melts or the wind stops.

If the overload exceeds a value determined by the characteristics of the rod 7, the latter undergoes plastic deformation to reach a permanent maximum elongation corresponding to the alignment of the arms, which then alone support the tension due to the overloading of the conductors. Upon alignment of the arms, as referred to in the preceding sentence, the arms are disposed in the full open position indicated in dashed lines in FIG. 4. In this full open position, first pole-side arm 1 and first conductor-side arm 2 extend in opposite directions from hinge pin 6, and the second pole-side and conductor-side arms likewise extend in opposite directions. The return of the arms to the original separation and of the conductors to their initial sag is then no longer automatic immediately when the overload disappears, and, as soon as the atmospheric conditions have become normal again, it becomes essential to fold the arms back with suitable mechanical means and replace rod 7.

As can be seen, the size of the resistant section of the rod 7 is precisely determined as a function of the lever arms of the system, the material of which this rod is made and the deformation stresses exerted.

The length of this rod is determined so that, in the extreme case where the system slackens completely, and the arms move to the full open position, this does not cause the said rod to break completely as a result of necking, thereby avoiding a shock in the conductor and on the fitting.

The difference in distance between twice the length of the arms and their initial separation gives the total possible slackening distance of the conductor.

The indicator link 21 makes it possible to see from the ground whether the rod has exceeded its elastic deformation. This indicator link rocks when the bolt 22 leaves the slot 21a, i.e. for a given value of the separation of the arms, which indicates that the rod has undergone plastic deformation and must be replaced.

The rod 7 consists of a rod threaded over the whole of its length and made with precision as regards the diameter of the root of the thread. This diameter is determined for each batch of metal which is to be used to manufacture each rod model. The material of which this rod is made and its heat treatment are chosen according to the tensile and elongation characteristics for each model and according to the stresses experienced when it is used in a power line. The different rod models are numbered and marked with a color code in order to prevent an incorrect model from being used.

If reference is made to FIG. 1, it is noted that the rod 7 is surrounded by a guide tube 12, the purpose of which is to keep the rod in the axis of the pivot pins, when the rod deforms, and to center the spacer sleeves 10 and 11, whose lengths are determined according to the length of the rod 7, which is itself governed by the desired elongation.

Figure 7:
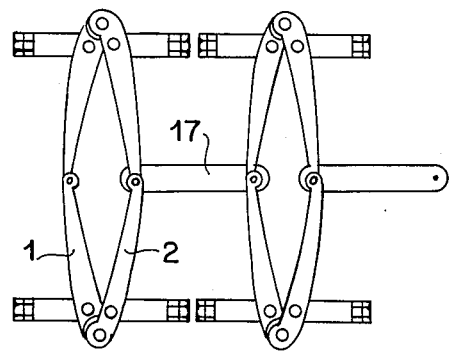
FIG. 7 is a diagrammatic view showing the assembly diagram for four apparatuses in series-parallel.
Figure 8:
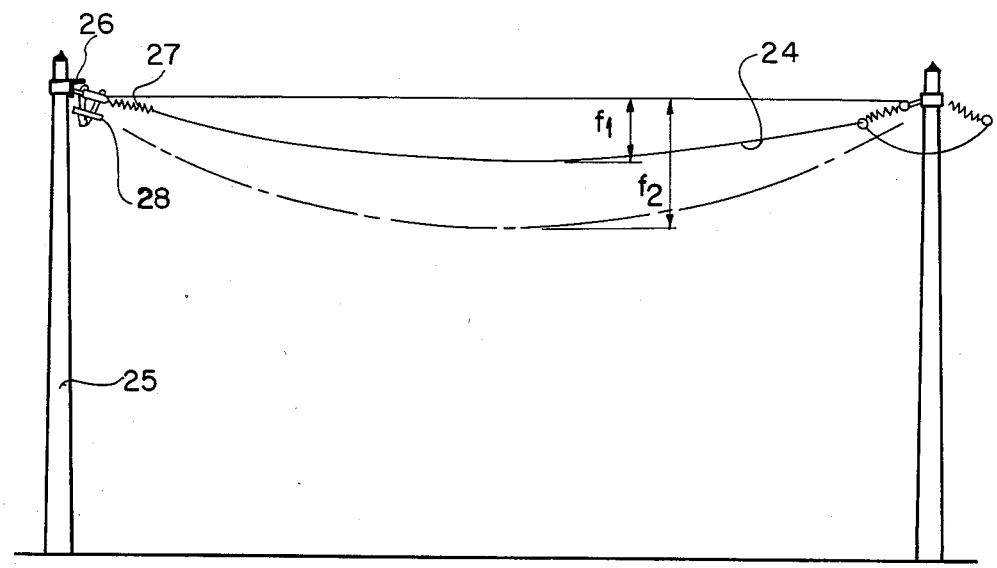
FIG. 8 is a front view of part of a line, between two line poles, equipped with simple devices according to the invention.
Figure 9:
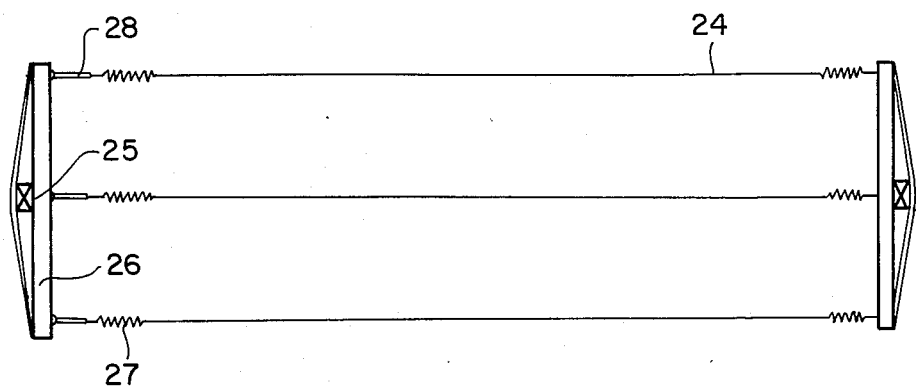
FIG. 9 is a top view of part of a line, between two line poles, equipped with simple devices according to the invention.

With reference to FIGS. 4, 5, 6 and 7, it is noted that it is possible to instal:
- a single device which makes it possible to obtain a maximum slackening distance C under a tension F (FIG. 4).
- two apparatuses coupled in series, the distal ends of the conductor-side arms of one device being connected to the distal ends of the pole-side arms of the other device, which make it possible to obtain a slackening distance 2C under a tension F (FIG. 5).
- two apparatuses coupled in parallel, the distal ends of the pole-side arms of the devices being connected to one another, the distal ends of the conductor side arms of the devices also being connected to one another, which make it possible to obtain a slackening distance C under a tension 2F (FIG. 6).
- four apparatuses coupled in series-parallel, which make it possible to obtain a slackening distance 2C under a tension 2F (FIG. 7).

These modes of installation do not imply a limitation and can be repeated as many times as the conditions dictate.

As can be seen, the device is defined according to the strength of the cable or conductor and the strength of the fitting and the support pole. It can therefore provide effective protection for the assembly.

The device with controlled deformation according to the invention is intended mainly for equipping low, medium and high tension power lines, but it can also be used to advantage for reducing tension in all kinds of wires or cables where temporary overloading is capable of damaging or permanently deforming the supports.

What is claimed is:

1. A device with controlled deformation for reducing the stresses exerted on a power line conductor and power line pole by reducing the tension of the conductor and increasing its sag comprising:

(a) a first pole-side arm and a first conductor-side arm, said arms being pivotally connected to one another at a first pivot axis, each of said arms having a distal end remote from said pivot axis, said distal ends of said pole-side and conductor-side arms being adapted, respectively, for mechanical connection to the power line pole and to the power line conductor, said arms being movable between a closed position wherein said distal ends are adjacent one another and a full open position wherein said arms extend in opposite directions from said pivot axis and said distal ends are remote from one another;

(b) a rod of predetermined tensile elongation properties, one end of said rod being connected to each of said arms between said pivot axis and said distal ends of said arms so that said rod normally retains said arms in said closed position and said rod is elongated upon movement of said arms towards said full open position; and (c) means for providing a remote visual indication of the elongation of said rod.

2. The device claimed in claim 1, further comprising a second pole-side arm and a second conductor-side arm pivotally connected to one another at a second pivot axis coincident with said first pivot axis, said second pole-side arm extending parallel to said first pole side arm and said second conductor-side arm extending parallel to said first conductor-side arm, one end of the rod being connected to both of said pole-side arms, the other end of said rod being connected to both of said conductor-side arms.

3. The device claimed in claim 1, wherein said rod is disposed adjacent said pivot axis, said rod extends transverse to said arms and protrudes outwardly beyond said arms when said arms are in said closed position, the device further comprising two elongated sleeves, each of said sleeves surrounding said rod adjacent one end thereof, one end of each such sleeve being connected to the associated end of said rod, the other end of each such sleeve being connected to one of said arms so that said rod is connected to said arms by way of said sleeves and upon movement of said arms from said closed position towards said full open position said sleeves are forced outwardly, away from one another.

4. The device as claimed in claim 3, wherein said rod is threaded over its entire length, the device further comprising nuts engaged with the threads of said rod adjacent the ends thereof, said sleeves being connected to said rod by way of said nuts.

5. The device as claimed in claim 3 wherein said rod is adapted to elongate without breakage upon movement of said arms to said full open position.

6. The device as claimed in claim 1 wherein said means for providing a remote visual indication includes an indicator link having two ends, one end of said indicator link being pivotally mounted to one of said arms adjacent the distal end thereof, the other end of said link being releasably connected to the other one of said arms adjacent the distal end thereof so that said indicator link is restrained against pivotal movement when said arms are in said closed position, said releasable connection being released upon predetermined movement of said arms toward said full open position.

7. The device as claimed in claim 6, further comprising a pair of bolts mounted to said distal ends of said arms and means for connecting said arms to said pole and conductor by way of said bolts, said one end of said indicator link being pivotally connected to said one of said arms by way of one of said bolts, said indicator link having an open-ended slot at said other end thereof, the other end of said bolts being engaged in said slot when said arms are in said closed position, said predetermined movement of said arms disengaging said other one of said bolts from said slot.

8. An assembly comprising a plurality of devices as claimed in claim 1 connected in series, the distal end of the pole-side arm of one of said devices being connected to the distal end of the conductor-side arm of another one of said devices.

9. An assembly comprising a plurality of devices as claimed in claim 1 connected in parallel, the distal ends of the pole-side arms of said devices being connected to one another, the distal ends of the conductor-side arms of said devices also being connected to one another.

10. A device with controlled deformation for reducing the stresses exerted on a power line conductor and power line pole by reducing the tension of the conductor and increasing its sag comprising:

(a) a first pole-side arm and a first conductor-side arm, said arms being pivotally connected to one another at a first pivot axis, each of said arms having a distal end remote from said pivot axis, said distal ends of said pole-side and conductor-side arms being adapted, respectively, for mechanical connection to the power line pole and to the power line conductor, said arms being movable between a closed position wherein said distal ends are adjacent one another and a full open position wherein said arms extend in opposite directions from said pivot axis and said distal ends are remote from one another; and (b) a rod of predetermined tensile elongation properties disposed adjacent said pivot axis, said rod extending traverse to said arms and protruding outwardly beyond said arms when said arms are in said closed position, one end of said rod being connected to each of said arms between said pivot axis and said distal ends of said arms so that said rod normally retains said arms in said closed position and said rod is elongated upon movement of said arms towards said full open position, said rod being adapted to elongate without breakage upon movement of said arms to said full open position.

* * * * *

UNITED STATES PATENT AND TRADEMARK OFFICE
CERTIFICATE OF CORRECTION

PATENT NO. : 4,616,103

DATED : October 7, 1986

INVENTOR(S) : Jacques Balteau

It is certified that error appears in the above-identified patent and that said Letters Patent is hereby corrected as shown below:

Column 6, line 15, "end" should read --one--.

Signed and Sealed this

Seventeenth Day of February, 1987

*Attest:*

DONALD J. QUIGG

*Attesting Officer*      *Commissioner of Patents and Trademarks*